United States Patent
McMillan et al.

(10) Patent No.: US 12,452,072 B2
(45) Date of Patent: Oct. 21, 2025

(54) ENCRYPTED STORAGE

(71) Applicant: Hewlett-Packard Development Company, L.P., Spring, TX (US)

(72) Inventors: Erich Wolfgang Gestacker McMillan, Spring, TX (US); Baraneedharan Anbazhagan, Spring, TX (US); Tevin Jaupaul Richards, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 54 days.

(21) Appl. No.: 18/684,784

(22) PCT Filed: Sep. 22, 2021

(86) PCT No.: PCT/US2021/051457
§ 371 (c)(1),
(2) Date: Feb. 19, 2024

(87) PCT Pub. No.: WO2023/048707
PCT Pub. Date: Mar. 30, 2023

(65) Prior Publication Data
US 2024/0430094 A1 Dec. 26, 2024

(51) Int. Cl.
*H04L 29/06* (2006.01)
*H04L 9/08* (2006.01)
*H04L 9/32* (2006.01)

(52) U.S. Cl.
CPC .......... *H04L 9/3226* (2013.01); *H04L 9/0825* (2013.01)

(58) Field of Classification Search
CPC ... H04L 9/3226; H04L 9/0825; G06F 21/575; G06F 21/572; G06F 21/62; G06F 12/14; G06F 9/44
See application file for complete search history.

(56) References Cited

U.S. PATENT DOCUMENTS

| | | | |
|---|---|---|---|
| 8,893,237 B2 | 11/2014 | Ganesan | |
| 9,667,626 B2 | 5/2017 | Lin | |
| 2005/0144443 A1* | 6/2005 | Cromer | G06F 21/78 713/165 |

(Continued)

FOREIGN PATENT DOCUMENTS

| | | | | |
|---|---|---|---|---|
| DE | 102017123113 A1 | 4/2019 | | |
| WO | WO-2014088239 A1 * | 6/2014 | ............. | G06F 12/14 |
| WO | 2020/028909 A1 | 2/2020 | | |

*Primary Examiner* — Yogesh Paliwal
(74) *Attorney, Agent, or Firm* — Quarles & Brady LLP

(57) ABSTRACT

An example storage medium is described, wherein the storage medium comprises instructions that, when executed cause a processor of an electronic device to store a private key in a first memory of the electronic device. The controller also stores an encrypted version of a password and validity information defining a condition to the password's validity in a second memory of the electronic device. During a boot process of the electronic device, the controller may detect a failure to decrypt data stored in a third memory and, upon this detection, decrypt the encrypted version of the password using the private key, and determine, using the validity information, whether the password is valid. If the password is valid, the controller may input the decrypted password to a decryption service, wherein the decryption service is to decrypt the data stored in the third memory.

15 Claims, 7 Drawing Sheets

(56) References Cited

U.S. PATENT DOCUMENTS

| | | | |
|---|---|---|---|
| 2010/0189265 A1* | 7/2010 | Ito | H04L 9/083 |
| | | | 380/278 |
| 2011/0072266 A1* | 3/2011 | Takayama | G06F 21/445 |
| | | | 713/168 |
| 2013/0275747 A1* | 10/2013 | Brumback | G06F 21/602 |
| | | | 713/155 |
| 2014/0129818 A1 | 5/2014 | Li et al. | |
| 2015/0339664 A1 | 11/2015 | Wong et al. | |
| 2016/0036790 A1 | 2/2016 | Shastry et al. | |
| 2016/0162669 A1* | 6/2016 | Mikhailov | G06F 21/12 |
| | | | 713/2 |
| 2016/0283404 A1 | 9/2016 | Xing et al. | |
| 2020/0045027 A1 | 2/2020 | Shastry et al. | |
| 2020/0252207 A1* | 8/2020 | Hanel | H04L 9/083 |
| 2021/0012010 A1* | 1/2021 | Chamala | G06F 21/602 |

* cited by examiner

ENCRYPTED STORAGE

BACKGROUND

Computing devices such as desktop computers, notebook computers, tablets, smart phones, etc, include instructions stored in a memory that are to initialize hardware in the computing device. Initializing hardware may include initializing storage devices that are encrypted to provide security for the data stored in the storage devices.

BRIEF DESCRIPTION OF THE DRAWINGS

Various example features will be apparent from the detailed description which follows, taken in conjunction with the accompanying drawings, wherein:

FIG. 1b is an example method of operation of the electronic device of FIG. 1a.

FIG. 2 is another example method of operation of the electronic device of FIG. 1a.

FIG. 3 is yet another example method of operation of the electronic device of FIG. 1a.

FIG. 4 is yet another example method of operation of the electronic device of FIG. 1a.

FIG. 5b is an example method of operation of the electronic device of FIG. 5a.

DETAILED DESCRIPTION

For security reasons, storage devices for computing devices may employ encryption wherein the contents of the storage device are encrypted prior to storage, so that unauthorized access of the contents can be blocked. An example of such an encryption system is Bitlocker™. Encrypted storage devices can be accessed by a password to be input under certain circumstances. To avoid a user needing to input the password each time that they wish to access data in the storage device, a password can be held in a secure storage unit of the computing device. An example of such a secure storage unit is a Trusted Platform Module (TPM), in which data is stored either in a dedicated integrated circuit or a secure part of an integrated circuit. The data is stored in a manner in which it is not easily accessible other than under specific conditions, such as being accessible to certain parts of the device's BIOS during the boot process.

During the device's boot process, the BIOS can sense that the password should be input to enable decryption of the storage device and so may request the stored password from the secure storage.

To block unauthorised access to the encrypted data, for example by tampering with the BIOS, a system for checking that the BIOS is in an expected state can be applied. However, when a computer device is modified during an update process, the updates may alter the BIOS. In such a situation, the system for checking the BIOS may assume that this alteration is a result of an unauthorised access attempt. Upon detection of the supposed unauthorised access, a password may be requested before decryption of the data is permitted.

Input of the password may be, for example, via manual input or via some automatic input. Manual input of the password is cumbersome for the user since the password maybe rather long. Moreover, the user may store the password, for example by writing it down, and this compromises the security of the encryption system. Automatic password input can be implemented using a server device connected to the computer via a network. However, in the absence of an available network, such an automatic input would fail. Further, in a situation where a remote administrator is attempting to update a computing device over a network, an update that changed the BIOS may block the administrator from completing the update. This is because remote insertion of the password may not be possible.

The disclosure described herein may permit storage of a password in an electronic device in a manner that permits use of the password to unlock an encryption system for data on the electronic device without revealing the password to a user. Moreover, the disclosure also enables removal of the password after use.

Figure 1A:
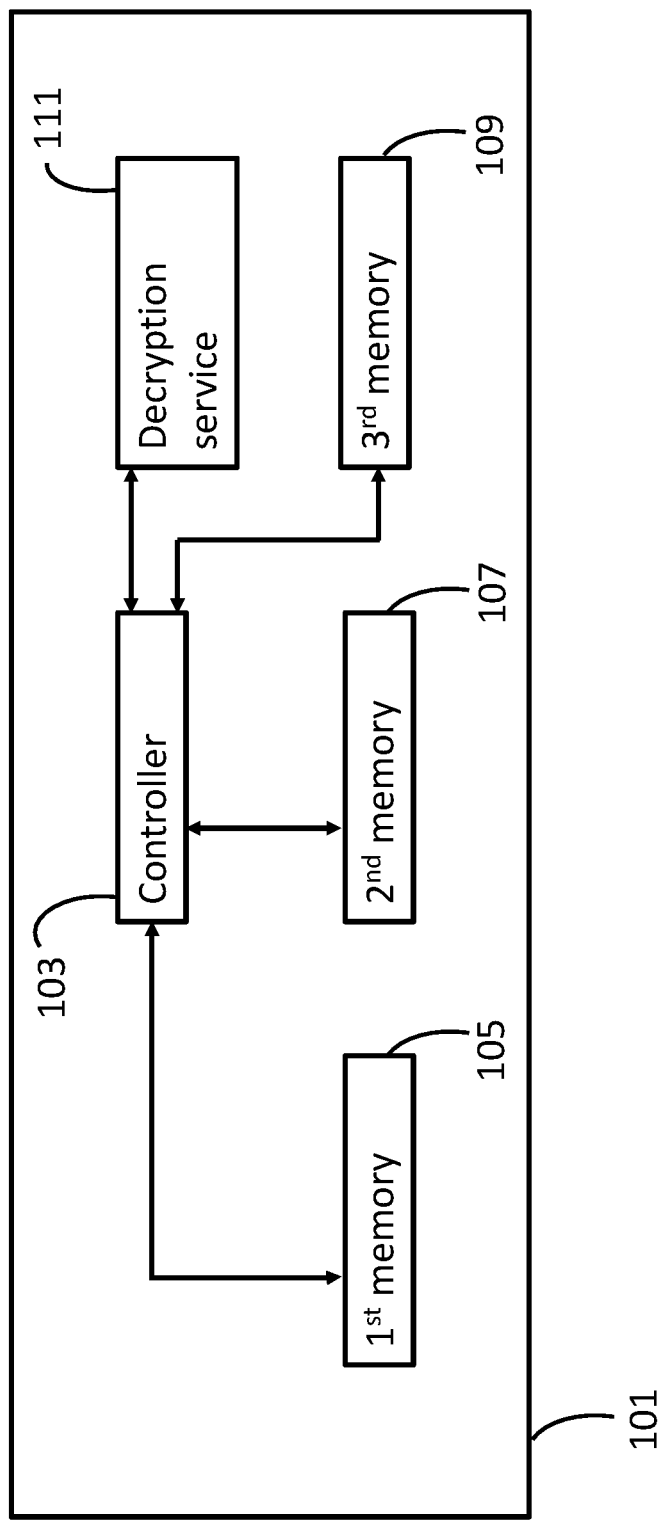
FIG. 1a is a block diagram of an example electronic device.

Referring to the Figures, FIG. 1a illustrates a block diagram of an example electronic device 101, such as a computer device. The electronic device 101 comprises a controller 103 a first memory 105, a second memory 107, a third memory 109, and a decryption service 111.

As indicated in FIG. 1a, the controller 103 is able to communicate data between itself and each of the memories 105, 107, 109 and also with the decryption service 111.

Figure 1B:
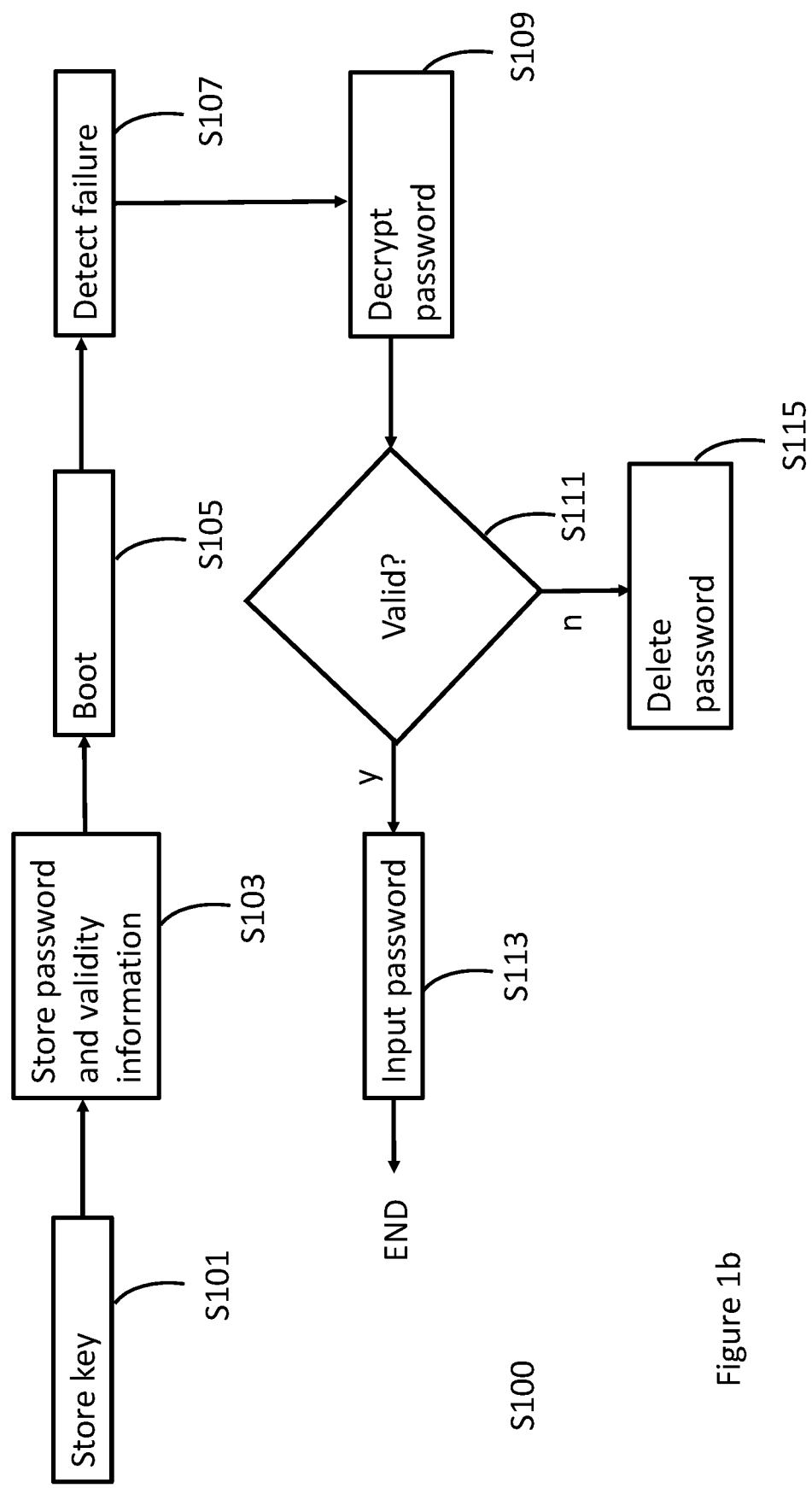

FIG. 1b illustrates an example method S100 of operation of the electronic device 101 of FIG. 1a. At S101, the controller 103 stores a private key in the first memory 105. At S103, the password and the validity information are stored S103 in a second memory 107.

A private key may be any private cryptographic key. In some examples the private key is from a public-private key pair generated by an algorithm for generating such keys. Thus, in these examples, the private key forms part of an asymmetric encryption system. In other examples, the private key may be a symmetric key wherein the same key can be employed for both encryption and decryption of data.

Validity information for the password may take the form of information that indicates a maximum number of uses after which the password becomes invalid. Alternatively, or additionally, a validity condition in the validity information may relate to a time condition or to a maximum number of reboots of the electronic device.

Controllers, such as example controller 103, may include one or more processors, processors may include hardware devices such as Central Processor Units (CPUs), Embedded Controllers (ECs), other general processors and co-processors. Processors may also include software devices wherein one or more virtual processors are configured to operate on integrated circuits. Processors may include threads of software that operate on such an integrated circuit. As used herein, software is machine readable instructions. Such instructions are executable by a controller or a processor, such as controller 103. Processors may be remote from the physical computer device and connected to the computer device via a wired or wireless network connection. Processors may be single-core or multicore processors, and different controllers may be implemented on different cores of a multicore processor.

In some examples, where the controller 103 comprises an EC, then the EC may be configured to provide services that are available during boot-up of the electronic device. For example, the EC may be configured to provide network communication capability during the boot process, prior to loading of an operating system. Such network capability may include Ethernet, cellular communications such as 4G and 5G, Wi-Fi, Bluetooth, etc.

Memory devices 105, 107, 109 of examples may include any electronic storage devices or memories including semiconductor-based random-access memory (RAM), magnetic discs, magnetic tapes, and optical discs. Memory devices may also include Read-Only Memory (ROM), such as semiconductor-based ROM. Memory devices may also include erasable programmable read-only memory (EPROM), and electronically erasable programmable read-only memory (EEPROM)

Memory devices 105, 107, 109 may be integrated into the computer device or removable from it. Memory devices 105, 107, 109 may also be partitioned into different sections, and so more than one of the memory devices as described in this disclosure may be implemented within a single physical device. Thus, for example, the first memory 105, the second memory 107 and the third memory 109 may each be a partition of a single memory.

Memory devices 105, 107, 109 may also be remote from the physical computer device, such as being present in a cloud storage device. Memory devices 105, 107, 109 may also be secure devices wherein access to the memory is in some way limited or restricted. For example, memory devices 105, 107, 109 may be inaccessible to a certain part e.g. processors of the electronic device or may request a password be supplied before access is granted.

In some examples, the first memory 105 may be a secure memory. A secure memory is one in which the data is stored in a manner wherein it is not easily accessible, other than under specific conditions, such as being accessible to certain parts of the electronic device during the boot process. In some examples, such a secure memory may require input of a password to permit access.

The storage S101, S103 of the private key, password and validity information may be accomplished prior to issuing the electronic device to a user. For example, a system administrator may store the information when first setting up the electronic device 101 for a user. The information may also be stored via a local intervention of an administrator such as by manually storing the information, for example using a USB memory device. Alternatively, the information may be stored by remote intervention wherein an administrator stores the information via a network connection.

At S105, the electronic device 101 is booted from an inactive state. In some examples, the reboot process is triggered by a user input to a keyboard. In other examples, the reboot is triggered by an instruction from the controller 103 of the electronic device 101.

A boot process of the electronic device may be the process by which the device is started up from an unpowered state. The boot process may, for example, involve the electronic device running software or firmware that initiates the system using a basic input/output system (BIOS).

As used herein, BIOS refers to hardware or hardware and instructions to initialize, control, or operate a computing device prior to execution of an operating system OS of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

At S105, upon booting of the electronic device 101, instructions are executed on the controller 103 of the device 101 to initiate the device 101. The device initiation may include instructions to obtain data from the third memory 109 to complete initiation of the electronic device 101. In examples, the data to be obtained from the third memory 109 comprise parts of an operating system for the electronic device 101, or other data for operation of the electronic device 101. The data in the third memory 109 is, in examples, encrypted with an encryption that renders the data unreadable to the controller 103. As a result, when attempting to obtain the data from the third memory 109, the controller 103 may detect, at S107, that there is a failure to decrypt the data from the third memory 109 if the decryption is blocked for some reason.

In some examples, the cause of the failure to decrypt the data is because software or hardware in the electronic device 101 has detected an event, such as a change to the device BIOS. Although such a change may occur merely as the result of an update made to the device software or hardware, such a change can also be representative of an indication that unauthorised access to the data has been attempted. Thus, for reasons of security, a change to the device BIOS may trigger a request for input of a password. Such a request may result in a failure to decrypt the data until the requested password is input.

In some examples, the electronic device performs a determination as to whether a password has been previously stored in the second memory 107. Such a determination may, for example, take the form of a check to determine whether a flag is set, whether a certain area of memory is occupied, or whether data identified as an encrypted password is found in the second memory 107. If the password has not been previously stored, then the boot process for the electronic device 101 cannot continue, and the controller 103 may be configured to present the user with information that a password is requested. In some examples, the user is also presented with a password entry screen for manual input of a password.

At S109, upon detecting the failure to decrypt the data in the third memory 109, and in the event that the password has been stored, the controller 103 decrypts the password stored in the second memory 107. Decryption of the password may be achieved by using the private key stored in the first memory 105 in combination with a decryption algorithm.

At S111, the controller 103 determines whether the password is valid by examining the validity information. The validity information may either be stored with the password, or it may be stored separately. If the validity information is stored with the password, then it may be encrypted together with the password such that one binary large object (BLOB) of data contains both the password and validity information in encrypted form.

At S111, the validity information is tested by the controller 103 to determine whether the password is valid. In examples, where the validity information takes the form of information that indicates a maximum number of uses after which the password becomes invalid, the validity information is compared with an event counter that indicates the number of uses, such as a number of reboots of the electronic device 101. The event counter may be implemented by the controller 103 and event information may be stored in a memory of the electronic device 101. In examples, the number of reboots is be defined starting from when the password and validity information were installed on the electronic device 101. In examples where the validity information takes the form of a time condition, the validity information is compared with a clock, such as a system clock, to make the determination. If the determination S111 indicates that the limit of validity has been reached, then the password is determined to be invalid.

In some examples, the validity information comprises a combination of conditions on the validity of the password. In these examples, the controller 103 may, for example, test the validity of the password by determining whether either a limit to the time or a limit to the number of reboots has been reached. If either test indicates that the limit of validity has been reached, then the password is determined to be invalid.

In examples where the validity information is stored separately from the password, then the validity of the password may be determined before decrypting the password.

In examples, if the password is determined S111 to be invalid, or no longer valid then, at S115, the controller 103 deletes the encrypted version of the password from the second memory 107. Thus, the electronic device 101 may be blocked from accessing the third memory 109 until, for example, a new valid password is stored in the second memory 107.

At S113, if the password is determined to be valid then the controller 103 uses the decrypted password to decrypt the data in the third memory 109 by inputting the password to the decryption service 111. In some examples, the decryption service 111 comprises software running on the controller 103 that is configured to control access to the third memory 109. In other examples, the controller running the decryption service 111 may be a separate controller.

The decryption service 111 may comprise software or hardware or both that is able to decrypt encrypted data stored in a memory device. A decryption service may also function as an encryption service for data that is to be stored in the memory device. The encryption service may be implemented as hardware in a dedicated processor, or section of a processor. Software implementations of the decryption service may run on a dedicated processor or as a program or thread on a processor performing other tasks, such as a CPU. In examples, the third memory 109 is encrypted using the Bitlocker™ encryption system, and so in such examples, the decryption service 111 corresponds to the Bitlocker™ software. In such examples, the private key corresponds to a Bitlocker™ private key.

When the decryption service 111 has used the password to decrypt a part, or all, of the data in the third memory 109, then the boot process of the electronic device 101 may continue, and the device may operate using the data in the third memory 109.

In some examples, the input S113 of the decrypted password to the decryption service 111 is effected using virtual keystrokes. Such virtual keystrokes may be generated by the controller 103. In such examples, the controller 103 is an embedded controller (EC). If the password is input by virtual keystrokes, then these may be obscured to a user of the electronic device 101. For example, the virtual keystrokes may be generated in a password entry screen of the electronic device with each keystroke replaced by a substituted character. The substituted character may be a blank space. In some examples, the virtual keystrokes are implemented by an EC providing instructions to a keyboard controller of the electronic device.

Figure 2:
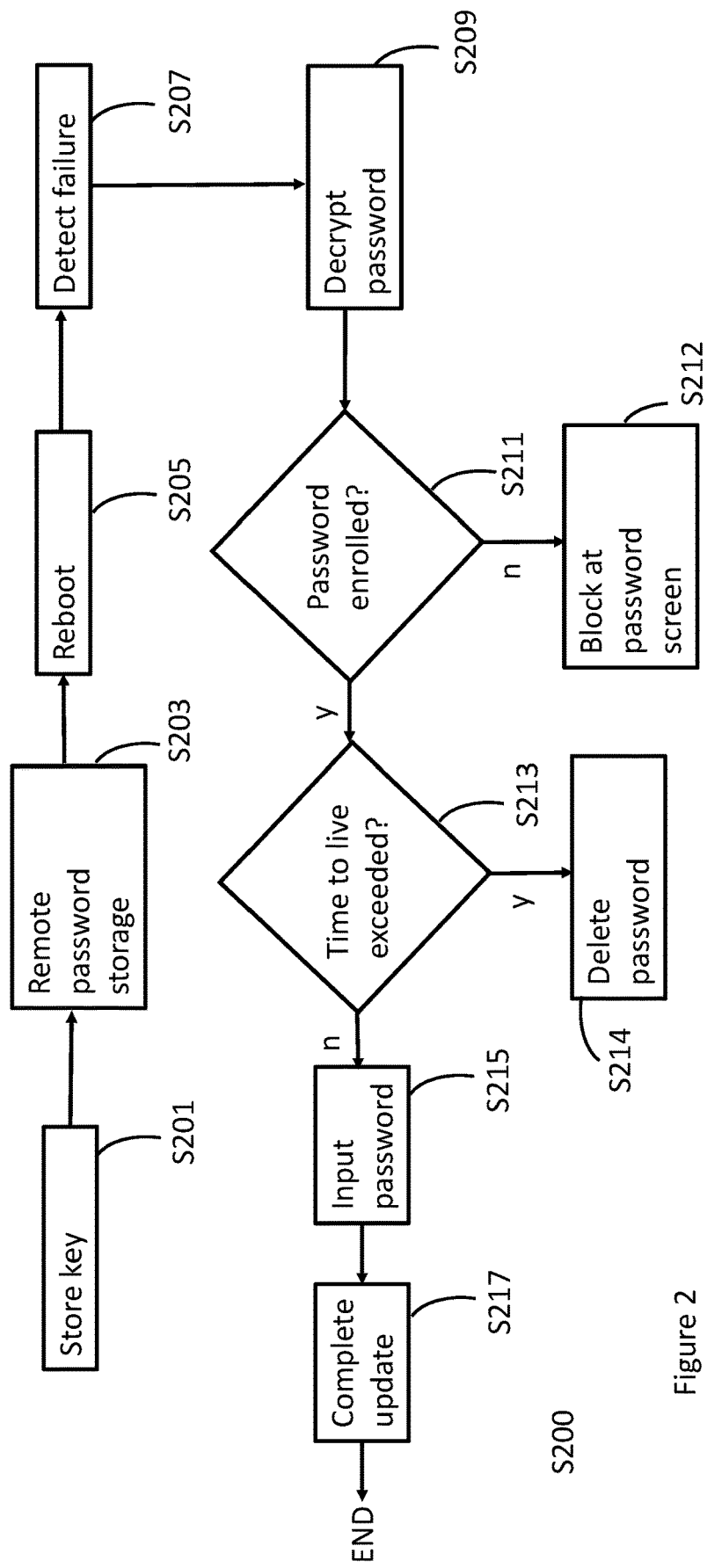

FIG. 2 illustrates another example method S200 of operation of the electronic device 101 of FIG. 1a for performing a remotely triggered update to the electronic device 101. Here, at S203, a private key is stored in the first memory 105. This feature corresponds to feature S101 as described in relation to FIG. 1b and so further explanation will not be repeated.

At S203, a password and validity information for the password are stored in the second memory 105. As with feature S103, this can be accomplished by an administrator remotely using a network connection. In this example, the storage of the password and validity information may be accomplished prior to, or as part of, the update to be applied to the electronic device.

At S205, the controller 101 reboots the electronic device 101. In some examples, the reboot process is triggered by a user input to a keyboard. In other examples, the reboot is triggered by an instruction from the controller 103 of the electronic device 101.

At S207, the controller 103 detects a failure to decrypt the data from the third memory 109. Here, the failure to decrypt may result from the updates performed by the administrator. The detection of the failure may be as describe din relation to S107 of FIG. 1b.

At S209, the password stored in the second memory is decrypted. Features S205, S207 and S209 correspond to features S105, S107 and S109 respectively from FIG. 1b and so further explanation will not be repeated.

At S211, the controller 103 makes a determination as to whether the password is enrolled in the second memory 105 of the electronic device 101. Such a determination may, for example, take the form of a check to determine whether a flag is set, whether a certain area of memory is occupied, or whether data identified as an encrypted password is found in the second memory 107.

At S212, if the password is not enrolled, then the boot process for the electronic device 101 cannot continue, and the controller 103 may be configured to present the user with information that a password is requested. In some examples, the user is also presented with a password entry screen for manual input of a password. In this situation, the electronic device 101 may display the password entry screen until a valid password is input. If a further reboot of the electronic device 101 occurs, then the method would restart from S205 and the electronic device would again arrive at S212, and thus be blocked at the password entry screen.

At S213, if the password is enrolled then the controller 103 determines whether the password in valid by testing the validity information. In this example, the validity information may comprise a time limit after which the password is no longer valid. If the time limit is exceeded, then at S214, the password is deleted from the second memory 105. In some examples, the controller 103 is configured to then present the user with information that a password is requested as with feature S212.

At S215, if the password is determined to be both enrolled and valid, then the controller 103 uses the decrypted password to decrypt the data in the third memory 109 by input of the password to the decryption service 111. When the decryption service 111 has used the password to decrypt a part, or all, of the data in the third memory 109, then the boot process of the electronic device 101 may continue, and the device may operate using the data in the third memory 109.

At S217, the update to the electronic device can complete. In some examples, the password is then automatically deleted from the second memory. In alternative examples, the password remains, and may be deleted after a further reboot if a further determination S213 of the validity indicates that the time to live has been exceeded.

Figure 3:
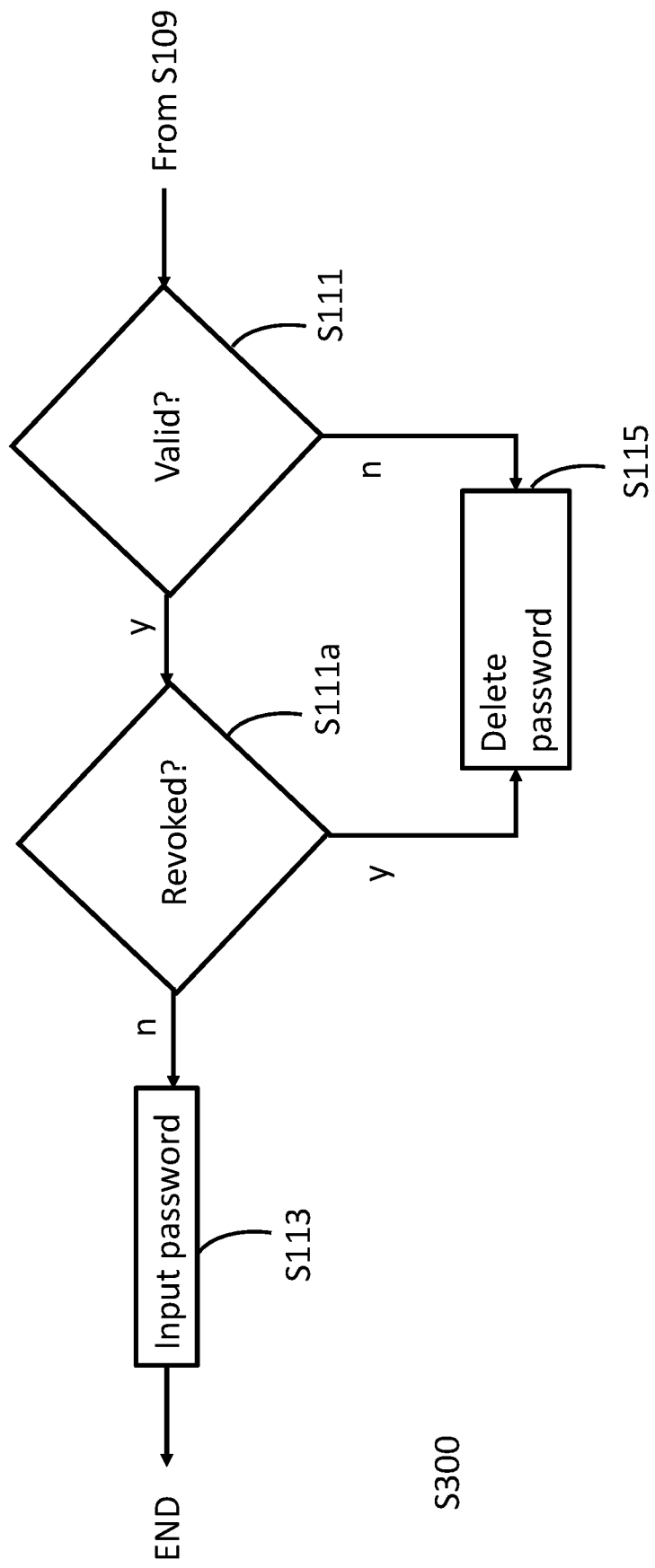

FIG. 3 illustrates a further example method S300 of operation of the electronic device 101 of FIG. 1a. FIG. 3 illustrates an example in which, when determining the validity of the password, password revocation is considered in addition to the password validity information. In this example, the method of FIG. 1b can be employed, with changes being to the determination S111 of whether the password is valid. In this example at S111, as part of the determination of whether the password is valid, the controller 103 may make the same determination S111 as to whether the password is valid in consideration of the validity information as is described in relation to FIG. 1b or FIG. 2. In addition, at S111a the controller 103 also determines whether a revocation message for the password has been received. Such a message may be received, for example, at the controller 103 from a remote device such as a server performing an administrative function. Such a server could be a Windows Deployment Services (WDS) server.

If the controller 103 determines that the password remains valid, both in consideration of the validity information and also by virtue of no revocation message being received, then at S113 the controller 103 inputs the password to the decryption service 111 as described in relation to FIG. 1b.

Conversely, if the password is determined to have either been revoked or is invalid in consideration of the validity information then, at S115, the controller 103 is further configured to delete the encrypted version of the password from the second memory 107 as described in relation to FIG. 2.

In examples, the controller 103 may be further configured to determine whether an unauthorised attempt has been made to access the encrypted version of the password. Such a determination may, for example, be made on the basis of the receipt of keystrokes that indicate access, or attempted access, to the password or the encrypted version of the password. If such an unauthorised access attempt has been detected, then the controller 103 may be further configured to delete the encrypted version of the password from the second memory 105. Alternatively, or additionally, the controller 103 may also be configured to delete the private key from the first memory 105 if an unauthorised access attempt to the password has been detected.

In some examples, the encrypted version of the password is stored in the second memory 107 via a UEFI variable. Thus, the encrypted version of the password may be made available to both a BIOS controller and also to an operating system.

Figure 4:
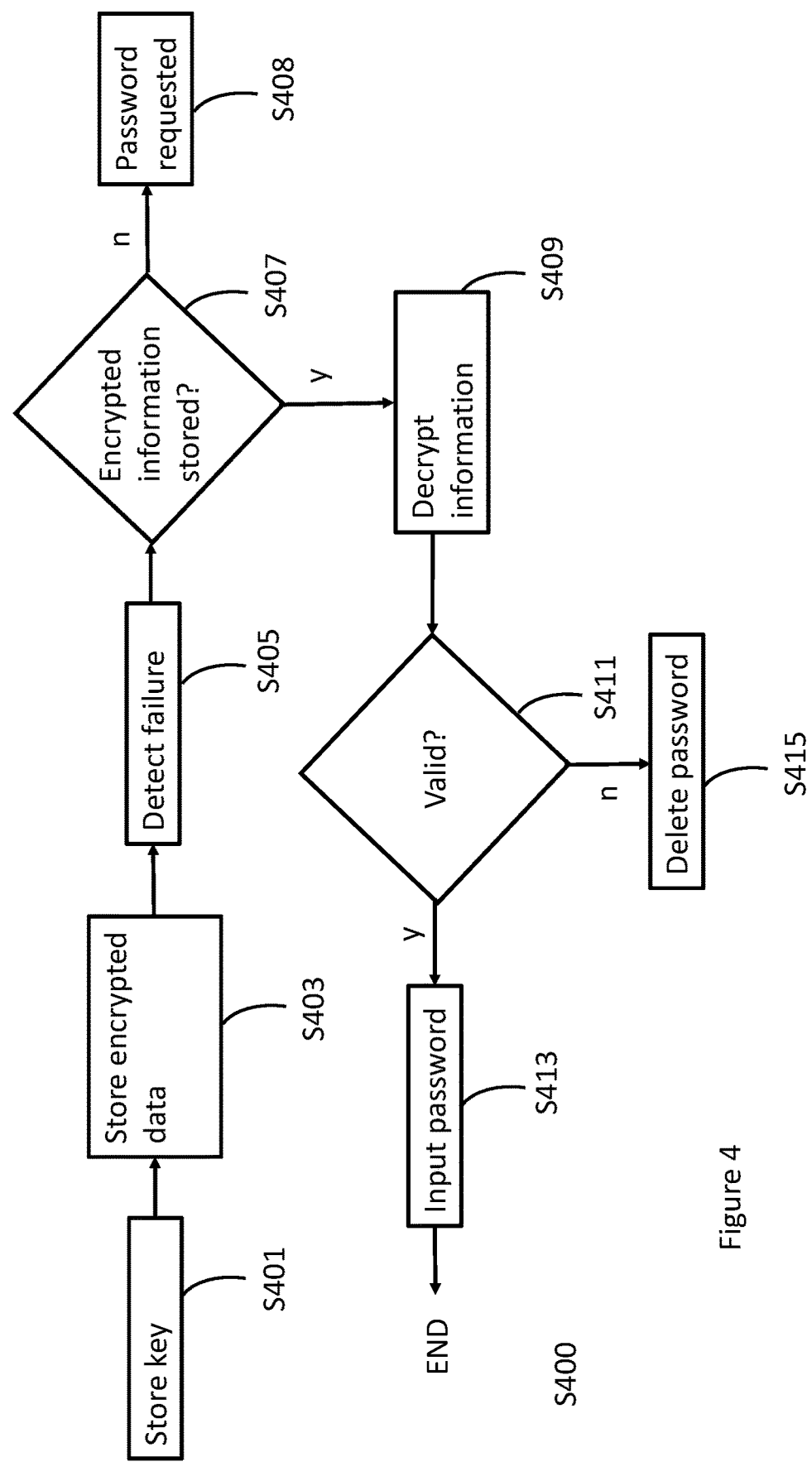

FIG. 4 illustrates another example method S400 of operation of the electronic device 101 of FIG. 1a. At S401, a private key is stored in the first memory 105. The first memory 105 is a secure memory. The storage of the private key may be accomplished prior to issuing the electronic device 101 to a user as is described in relation to FIG. 1b.

At S403, encrypted data is stored in the third memory 109 of the electronic device 101. As described in relation to FIG. 1b, initiation of the device 101 may include instructions to obtain data from the third memory 109 to complete initiation of the electronic device 101. In examples, data obtained from the third memory 109 may comprise parts of an operating system for the electronic device 101, or other data requested for operation of the electronic device 101. The data in the third memory 109 is, in examples, encrypted with an encryption that renders the data unreadable to the controller 103. As a result, at S405, when attempting to obtain the data from the third memory 109, the controller 103 may detect that there is a failure to decrypt the data from the third memory 109 in the manner described in relation to FIG. 1b.

After detection of the failure to decrypt at S405, at S407, the controller 103 makes a determination as to whether information corresponding to an encrypted version of a password and validity information are stored in the second memory 107 of the electronic device 101. Such a determination may, for example, take the form of a check to determine whether a flag is set, whether a certain area of memory is occupied, or whether data identified as an encrypted password is found in the second memory 107.

At S408, if the password has not been previously stored, then the boot process for the electronic device 101 cannot continue, and the controller 103 presents the user with information that a password is requested. In some examples, the user is also presented with a password entry screen for manual input of a password.

As described in relation to FIG. 1b, the password and validity information may be either stored together or separately.

At S409, if the determination indicates that information corresponding to an encrypted version of a password and validity information are stored in the second memory 107 of the electronic device 101, then the controller 103 decrypts the password stored in the second memory 107. Decryption of the password may be achieved by using the private key stored in the first memory 105 in combination with a decryption algorithm.

At S411, the validity information is then tested by the controller 103 to determine whether the password is valid. In some examples, the determination of validity may be as described in relation to S111 of FIG. 1b. In other examples, the determination may be as described in relation to FIG. 3.

At S413, if the password is determined to be valid, then the controller 103 uses the decrypted password to decrypt the data in the third memory 109 by input of the password to the decryption service 111 as described in relation to FIG. 1b.

At S415, if the password is determined to be invalid, then the controller 103 deletes the password from the second memory 107.

When the decryption service 111 has used the password to decrypt a part, or all, of the data in the third memory 109, then the boot process of the electronic device 101 may continue, and the device 101 may operate using the data in the third memory 109.

In some examples, the controller 103 uses a secure processing environment to decrypt the password stored in the second memory. Thus, other, less secure, elements of the electronic device 101 may be blocked from accessing the decrypted version of the password.

In some examples, the controller 103 receives the encrypted version of the password via a secure channel. For example, if the electronic device 101 is connected within a controlled network, such as a company network, the secure channel may be the company network. In other examples, the secure channel is via a cellular network using a device, such as a 4G or 5G communication device. In such examples, the cellular device may have been registered as a device with a server that provides the password. In examples, where the controller 103 is an EC, the communication device that provides the cellular communications forms part of the electronic device 101 and has cellular communications enabled by the controller 103. In other examples, the secure channel may be enabled via a virtual private network (VPN) between the electronic device 101 and a server. In other examples, other types of secure network including near-field communication or Bluetooth are also used to provide the secure channel. Moreover, the secure channel may also take the form of a physical device that may be given to a trusted party to physically install data on the electronic device 101. Such a physical device could, for example, be a universal serial bus (USB) memory device.

In some examples, the detection of the failure to decrypt the encrypted password is made on the basis that the electronic device 101 detects a specific internal state. Such an internal state could, for example, be a state in which the electronic device 101 is displaying a password entry screen to a user. In other examples, the detection may be based on receipt of data from other components in the electronic device 101.

Figure 5A:
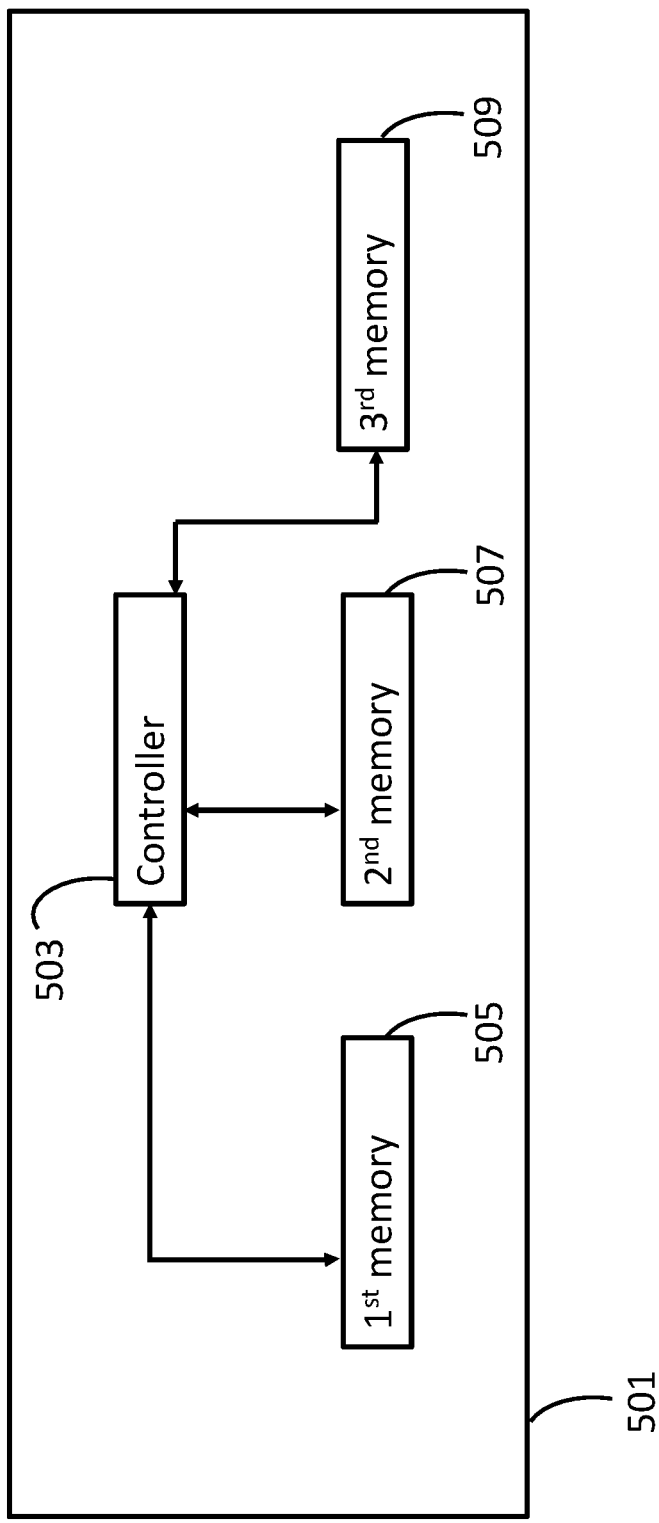
FIG. 5a is a block diagram of another example electronic device.

FIG. 5a illustrates a block diagram of another example electronic device 501, such as a computer device. The electronic device 501 comprises a controller 503, a first memory 505, a second memory 507, and a third memory 509. As indicated in FIG. 5a, the controller 503 is able to communicate data between itself and each of the memories 505, 507, and 509.

Figure 5B:
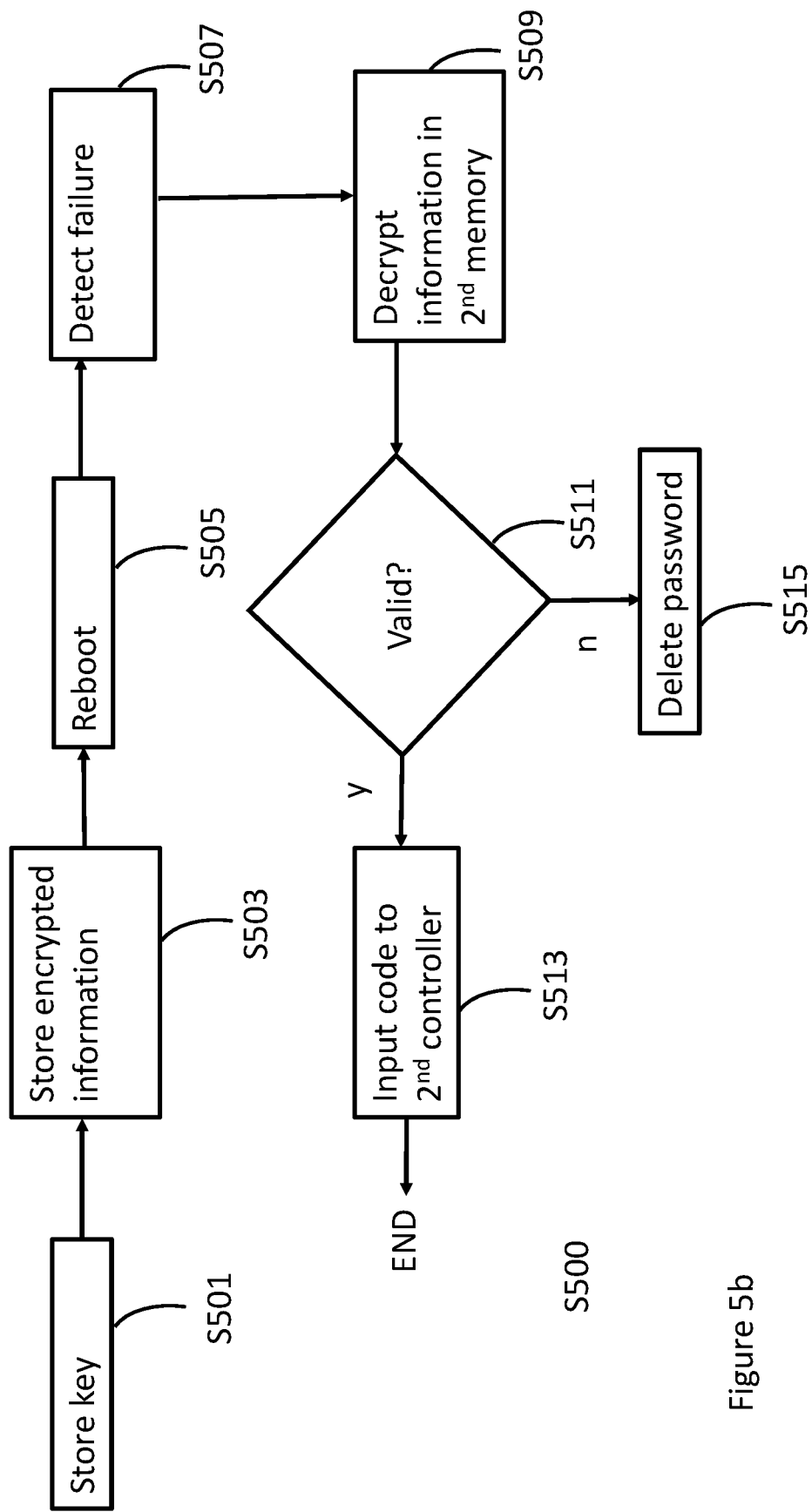

FIG. 5b illustrates an example method 500 of operation of the electronic device 501 of FIG. 5a. At S501, an encryption key is stored in the first memory 505. At S503 encrypted information comprising an access code and information defining a time limit of the access code's validity are stored in the second memory 507. In this example, the first memory 505 may be a secure memory. The storage of the private key and encrypted information may be accomplished prior to issuing the electronic device 501 to a user. For example, a system administrator may store the information when first setting up the electronic device 501 for a user. The information may also be stored via a local intervention of an administrator such as by manually storing the information, for example using a USB memory device. Alternatively, the information may be stored by remote intervention wherein an administrator stores the information via a network connection.

At S505, the electronic device 501 then performs a reboot, either automatically, for example, during the course of an update or installation procedure, or as a result of direct intervention by a user or administrator.

Upon rebooting S505 of the electronic device 501, instructions are executed on the controller 503 of the electronic device 501 to initiate the electronic device 501. The device initiation may include instructions to obtain data from the third memory 509 to complete initiation of the electronic device 501. In examples, data obtained from the third memory 509 may comprise parts of an operating system for the electronic device 501, or other data requested for operation of the electronic device 501. The data in the third memory 509 is, in examples, encrypted with an encryption that renders the data unreadable to the controller 503. As a result, when attempting to obtain the data from the third memory 509, the controller 503 may detect, at S507, that there is a failure to decrypt the data from the third memory 509.

At S509, upon detecting the failure to decrypt the data in the third memory 509, the controller 503 decrypts the encrypted information stored in the second memory 507. Decryption of the stored information may be achieved by using the encryption key stored in the first memory 505 in combination with a decryption algorithm.

At S511, the information defining the limit of validity is tested by the controller 503 to determine whether the access code is valid. In examples, the information defining the time limit takes the form of information that indicates a time after which the access code becomes invalid. In other examples, the information defining the time limit of validity takes the form of a number of boot cycles after which the access code becomes invalid. Thus, to test the validity, the information defining the time limit of validity may be compared with a clock or an event counter that indicates the number boot cycles of the electronic device 501 in the manner as described in relation to FIG. 1b. Moreover, the information defining the time limit of validity can comprise a limit to both the time and the number of boot cycles as is described in relation to FIG. 1b.

At S515, if the password is determined to be invalid, then the controller 503 deletes the password from the second memory 507.

At S513, if the password is determined to be valid, then the controller 503 uses the decrypted password to decrypt the data in the third memory 509 by input of the password to a second controller. In examples, the second controller is a separate controller in the electronic device 501. In further examples, the second controller comprises software that is configured to control access to the third memory 509. In other examples, the second controller may be the controller 503 of the electronic device 501.

In some examples, the detection S507 of the failure to decrypt data stored in the third memory 509 is based on the controller 503 detecting that input of a password is requested. In such examples, the controller 503 may detect that the electronic device 501 is displaying a password entry screen to a user. In other examples, the detection may be based on receipt of data from other components in the electronic device 101 that indicates that a password is requested.

In some examples, the controller 503 is to receive the encrypted information stored in the second memory 507 via a cellular network connection in communication with the controller 503. In such examples, the cellular network connection may be provided by a cellular network device that forms a part of the electronic device 501. In examples where the controller is an EC, the cellular network device may communicate directly with the EC.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any some examples may be used alone, or in combination with other features described, and may also be used in combination with any features of any other of the examples, or any combination of any other of the examples.

The invention claimed is:

1. A non-transitory computer-readable storage medium comprising instructions that, when executed by a controller of an electronic device, cause the controller to:

store a private key in a first memory of the electronic device;

store an encrypted version of a password and validity information defining a condition to the password's validity in a second memory of the electronic device;

detect, during a boot process of the electronic device, a failure to decrypt data stored in a third memory;

decrypt the encrypted version of the password using the private key;

determine, using the validity information, whether the password is valid; and if the password is valid, input the decrypted password to a decryption service, wherein the decryption service is to decrypt the data stored in the third memory.

2. The non-transitory computer-readable storage medium of claim 1, wherein the instructions, when executed by the controller, cause the controller to obscure the input of the decrypted password from a user of the electronic device using virtual keystrokes.

3. The non-transitory computer-readable storage medium of claim 2, wherein the instructions, when executed by the controller, cause the controller to obscure the input of the decrypted password from the user using the virtual keystrokes by providing instructions to a keyboard controller of the electronic device.

4. The non-transitory computer-readable storage medium of claim 1, wherein the condition to the password's validity comprises an event count after which the password is no longer valid.

5. The non-transitory computer-readable storage medium of claim 4, wherein the event count comprises a count of reboots to the electronic device since storage of the encrypted version of the password.

6. The non-transitory computer-readable storage medium of claim 1, wherein the instructions, when executed by the controller, cause the controller to determine, using the validity information, whether the password is no longer valid and, responsive to determining that the password is no longer valid, delete the encrypted version of the password from the second memory.

7. The non-transitory computer-readable storage medium of claim 1, wherein the instructions, when executed by the controller, cause the controller to determine whether a revocation message for the password has been received and, if so, the controller is to delete the encrypted version of the password from the second memory.

8. The non-transitory computer-readable storage medium of claim 1, wherein the instructions, when executed by the controller, cause the controller to determine whether an unauthorised access attempt to the encrypted version of the password has been detected and, if so, the controller is to delete the encrypted version of the password from the second memory.

9. The non-transitory computer-readable storage medium of claim 1, wherein the instructions, when executed by the controller, cause the controller to store the encrypted version of the password in the second memory as a unified extensible firmware interface (UEFI) variable.

10. A non-transitory computer-readable storage medium comprising instructions that when executed by a controller of an electronic device, cause the controller to:

store, in a secure memory of the electronic device, a private key;

store encrypted data in a third memory of the electronic device;

detect, during a boot process of the electronic device, a failure to access data stored in the third memory;

upon detection of the failure to access the third memory, determine whether encrypted information is stored in a second memory of the electronic device, wherein the encrypted information comprises a password and validity information defining a condition under which the password is valid;

if the encrypted information is stored in the second memory, decrypt the encrypted information using the private key;

determine, using the validity information, whether the password is currently valid; and if the password is valid, use the decrypted password to decrypt the data stored in the third memory.

11. The non-transitory computer-readable storage medium of claim 10, wherein the instructions, when executed by the controller, cause the controller to use a secure processing environment to decrypt the encrypted information stored in the second memory.

12. The non-transitory computer-readable storage medium of claim 10, wherein the instructions, when executed by the controller, cause the controller to receive the encrypted password via a secure channel.

13. An electronic device comprising:

a first memory;

a second memory;

a third memory; and a controller to:

store an encryption key in the first memory;

store encrypted information comprising an access code and information defining a time limit of the access code's validity in a second memory of the electronic device;

perform a reboot and detect, during the reboot process, a failure to decrypt data stored in the third memory;

in response to detection of the failure to decrypt data stored in the third memory, decrypt the encrypted information stored in the second memory using the encryption key;

determine, using the information defining a limit of the access code's validity, whether the access code is valid; and if the access code is valid, input the decrypted access code to a second controller, wherein the second controller is to decrypt the data stored in the third memory.

14. The electronic device of claim 13, wherein the controller is to detect the failure to decrypt data stored in the third memory based on detecting that input of a password is requested.

15. The electronic device of claim 13, wherein the controller is to receive the encrypted information via a cellular network.

* * * * *